United States Patent
Etgen (10) Patent No.: US 7,035,772 B2
(45) Date of Patent: Apr. 25, 2006

(54) METHOD AND APPARATUS FOR CALCULATING DATA INTEGRITY METRICS FOR WEB SERVER ACTIVITY LOG ANALYSIS

(75) Inventor: Michael Peter Etgen, Apex, NC (US)

(73) Assignee: International Business Machines Corporation, Armonk, NY (US)

( * ) Notice: Subject to any disclaimer, the term of this patent is extended or adjusted under 35 U.S.C. 154(b) by 690 days.

(21) Appl. No.: 09/871,498

(22) Filed: May 31, 2001

(65) Prior Publication Data

US 2002/0184570 A1 Dec. 5, 2002

(51) Int. Cl.
  *G06F 7/00* (2006.01)
(52) U.S. Cl. ............... 702/187; 702/81; 702/176; 702/179; 702/182; 707/202
(58) Field of Classification Search ............ 702/81, 702/82, 84, 86, 176–179, 182, 187; 709/224, 709/226; 707/202–204
  See application file for complete search history.

(56) References Cited

U.S. PATENT DOCUMENTS

| | | | | |
|---|---|---|---|---|
| 4,731,671 A | * | 3/1988 | Alkofer | 382/274 |
| 4,758,956 A | * | 7/1988 | Duffy | 702/10 |
| 5,152,007 A | * | 9/1992 | Uribe | 455/116 |
| 5,291,423 A | * | 3/1994 | Roosli | 702/82 |
| 5,412,801 A | * | 5/1995 | de Remer et al. | 714/20 |
| 5,675,510 A | * | 10/1997 | Coffey et al. | 709/224 |
| 5,675,727 A | * | 10/1997 | Watanabe | 714/20 |
| 5,756,967 A | * | 5/1998 | Quinn et al. | 219/130.21 |
| 5,778,387 A | * | 7/1998 | Wilkerson et al. | 707/202 |
| 5,892,917 A | * | 4/1999 | Myerson | 709/224 |
| 5,931,912 A | * | 8/1999 | Wu et al. | 709/224 |
| 5,954,820 A | * | 9/1999 | Hetzler | 713/323 |
| 6,073,128 A | * | 6/2000 | Pongracz et al. | 707/3 |
| 6,112,238 A | * | 8/2000 | Boyd et al. | 709/224 |
| 6,178,427 B1 | * | 1/2001 | Parker | 707/202 |
| 6,341,310 B1 | * | 1/2002 | Leshem et al. | 709/223 |
| 6,381,374 B1 | * | 4/2002 | Pourjavid | 382/275 |
| 6,725,242 B1 | * | 4/2004 | Gardner | 707/203 |
| 2001/0056438 A1 | * | 12/2001 | Ito | 707/204 |
| 2002/0062223 A1 | * | 5/2002 | Waugh | 705/1 |
| 2002/0107837 A1 | * | 8/2002 | Osborne et al. | 707/2 |
| 2002/0144272 A1 | * | 10/2002 | McLain et al. | 725/76 |
| 2003/0038836 A1 | * | 2/2003 | Ronald et al. | 345/738 |

FOREIGN PATENT DOCUMENTS

| | | | |
|---|---|---|---|
| JP | 03090639 A | * | 4/1991 |
| JP | 09257592 A | * | 10/1997 |

* cited by examiner

*Primary Examiner*—Marc S. Hoff
*Assistant Examiner*—Jeffrey R. West
(74) *Attorney, Agent, or Firm*—Duke W. Yee; A. Bruce Clay; Peter B. Manzo (57) ABSTRACT

A method, apparatus, and computer implemented instructions for maintaining data integrity in logs in a data processing system. A log is reviewed. A determination is made as to whether the log contains a data loss. Data may be added to replace the data loss in the log to increase integrity of the log if a determination is made that a data loss has occurred.

38 Claims, 4 Drawing Sheets

| Time Segments | Time Gap Tolerances (ms) |
|---|---|
| 12AM–5AM | 8200 |
| 6AM–11AM | 1400 |
| 12PM–5PM | 1900 |
| 6PM–11PM | 10400 |

FIG. 5

METHOD AND APPARATUS FOR CALCULATING DATA INTEGRITY METRICS FOR WEB SERVER ACTIVITY LOG ANALYSIS

FIELD OF THE INVENTION

The present invention relates generally to an improved data processing system, and in particular to a method and apparatus for analyzing data. Still more particularly, the present invention provides a method, apparatus, and computer implemented instructions for calculating data integrity metrics for Web server activity log analysis.

BACKGROUND OF THE INVENTION

Web site owners and Web site builders are interested in various statistics, such as who is browsing a Web site, what content users are requesting or downloading from a Web site, and when users are requesting or downloading content from a Web site. This type of information can be useful for determining the content, designs, or marketing campaigns that attract site visitors, retain them, and induce online purchasing decisions. Typically, Web site activity information is stored in log files on a Web server as the activity occurs.

In general, a log is a record of computer activity used for statistical purposes as well as troubleshooting and recovery. Many log files store information, such as incoming command dialog, error and status messages, and transaction detail. Web server logs are a rich source of information about user activity that a Web server automatically creates. The basic information stored in a log file is centered around a user request for resources from the Web server. Resources can be either Web pages, image files, or other media served by Web servers. The Web server logs information such as when a request is made, the requester's Internet Protocol (IP), address and domain (e.g., .gov, .edu., .com, etc.), the resource requested, and the server's success in fulfilling the request. Based upon the information in the logs, Web analytics professionals analyze data such as, requests (commonly known as hits), page views, and sessions.

Web server log file analysis has proven to be an inexact science for a number of reasons. One of the main reasons for this problem is data loss in the logs at both the point of recording and during the transfer process from storage to an analytical tool. Most log analysis applications do not deal with the grave issues surrounding data loss. Data loss may be caused, for example, by a Web server going off-line or otherwise temporarily being unable to write log records. Another frequent cause of data loss results from the electronic transfer of log files from servers to other computers where they will be analyzed. In many cases the transfer may appear to have been successful although some data was lost in the process. A less frequent but rather large scale problem is the addition of cloned Web servers to a network serving a Web site.

In many cases, the users of Web log analysis tools are not the owners of the Web servers, but instead are the content owners (i.e., Web hosting model), or provide Web analysis services to content owners (i.e., Web analytics service model). In this situation, the Web analytics professional must rely upon the Web Hosting company to have reliable servers and to ensure a reliable log transfer process from the hosting servers to the analytical software. The company must know when the hosting company servers have down time and when they make network configuration changes, such as the adding of clones for load balancing are made. Often, this information is not reliably provided to the analytics professional. Additionally, log files may be corrupted during the transfer process, such as FTP (File Transfer Protocol), from Web server to analytical tool.

As a result, log analyses may be based upon only partial data sets with the degree and timeliness of data loss being random. Many Web analytics professionals currently rely upon guessing as to when data loss occurs, when data loss is suspected, and to what degree its effect. To address the issue, they usually either merely note that data loss happened or further attempt to supply subjective estimates of summary statistics. For example, they may guess at numbers or just use the last reporting period data. Since in most cases the analytics professionals are actively involved in trying to remedy whatever caused the data loss so as to avoid it in the future, they often do not spend a great deal of time applying systematic methods to account for data loss. Poor quality data is then passed on to those end users for whom Web site activity statistical reports are generated, such as Web site designers or marketing personnel.

Therefore, it would be advantageous to have an improved systematic method and apparatus for identifying when data loss occurs, identifying how much data loss has occurred, and providing remunerative action for the data loss to generate a more accurate analysis.

SUMMARY OF THE INVENTION

The present invention provides a method, apparatus, and computer implemented instructions for addressing data integrity in logs in a data processing system. A log is reviewed. A determination is made as to whether the log contains a data loss. An algorithm may be employed that uses prior data sets to calculate more accurate summary statistics and data integrity metrics if a determination is made that a data loss has occurred.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
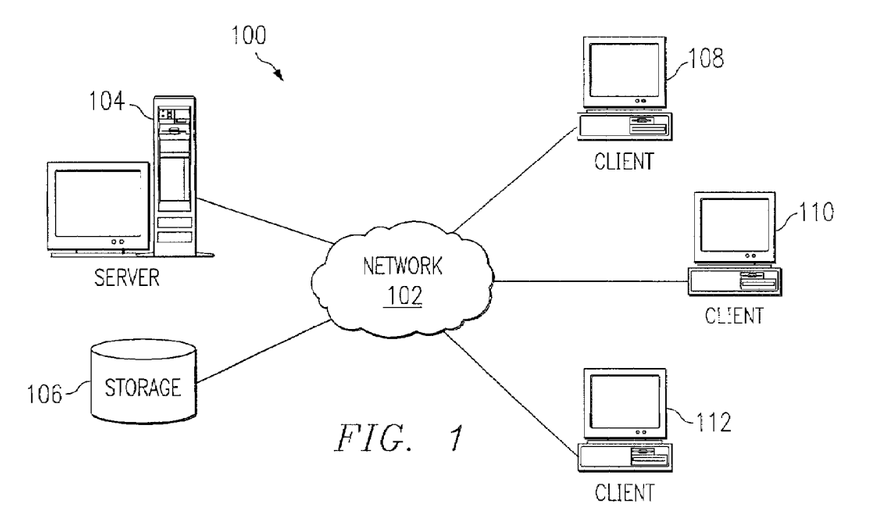
FIG. 1 is a pictorial representation of a network of data processing systems in which the present invention may be implemented.

With reference now to the figures, FIG. 1 depicts a pictorial representation of a network of data processing systems in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables. In the depicted example, server 104 is connected to network 102 along with storage unit 106. In addition, clients 108, 110, and 112 are connected to network 102.

These clients 108, 110, and 112 may be, for example, personal computers or network computers. In the depicted example, server 104 provides data, such as boot files, operating system images, and applications to clients 108-112. Clients 108, 110, and 112 are clients to server 104. Server 104 may store data in logs, which may reflect accesses and requests by clients 108, 110, and 112. Network data processing system 100 may include additional servers, clients, and other devices not shown.

In the depicted example, network data processing system 100 is the Internet with network 102 representing a worldwide collection of networks and gateways that use the TCP/IP suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

Figure 2:
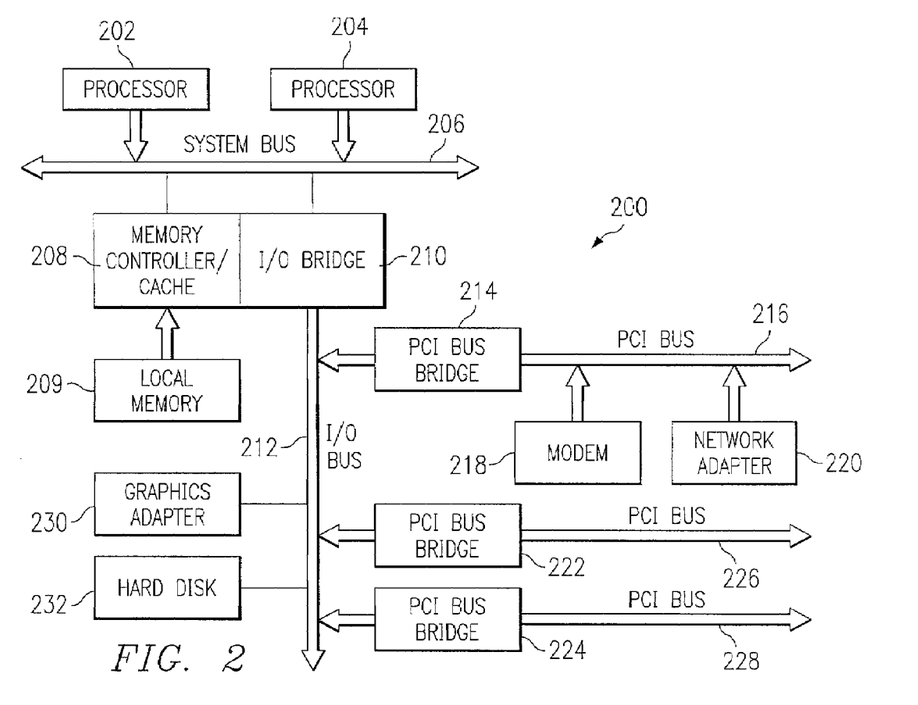
FIG. 2 is a block diagram of a data processing system that may be implemented as a server in accordance with a preferred embodiment of the present invention.

Referring to FIG. 2, a block diagram of a data processing system that may be implemented as a server, such as server 104 in FIG. 1, is depicted in accordance with a preferred embodiment of the present invention. Additionally, the analysis of logs generated by a server may be analyzed using a data processing system similar to data processing system 200.

Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communications links to clients 108–112 in FIG. 1 may be provided through modem 218 and network adapter 220 connected to PCI local bus 216 through add-in boards.

Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM e-Server pSeries system, a product of International Business Machines Corporation in Armonk, N.Y., running the Advanced Interactive Executive (AIX) operating system or LINUX operating system.

The present invention provides a method, apparatus, and computer implemented instructions for calculating data integrity metrics for Web server activity log analysis. The data integrity metrics are provided for variables, such as, for example, hits, requests, page views, and sessions. These data integrity metrics may be used by a log analysis process to "fill-in" holes in data if desired. For example, reports showing total hit counts may be generated with "fill-in" data when data integrity problems are identified. Such a report may state that the numbers reflect the likely number of total hits with some measure of data integrity.

Figure 3:
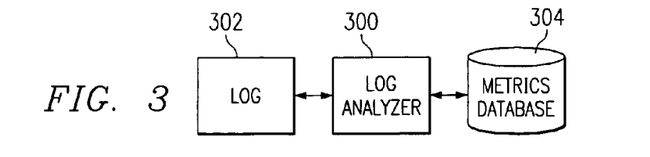
FIG. 3 is a diagram illustrating data flow in calculating data integrity metrics for Web server activity log analysis in accordance with a preferred embodiment of the present invention.

With reference now to FIG. 3, a diagram illustrating data flow in calculating data integrity metrics for Web server activity log analysis is depicted in accordance with a preferred embodiment of the present invention. In this example, log analyzer 300 receives log 302 for analysis. The analysis is conducted using metrics database 304. The analysis may examine time segments within the log to determine whether time gaps between data are sufficient to indicate that a loss of data has occurred. This analysis may include comparing the log to prior logs to determine whether any deviations in the current log are sufficient to warrant an indication that a data loss has occurred.

In order to provide data integrity metrics and replacement weighted average summary data when there is data loss for Web server activity data sets, a "time segment" is determined to serve as the basis for making calculations. The time segment may be determined with as complex or simple a method as the user desires.

In the following example, the only time segment determining factor is hour of day. Additional factors such as day of week, also could be reasonably included in determining time segments, such as Web server activity, which typically fluctuates heavily on certain days of the week as well as hours of the day. Week in month or month in year may be included as further extensions of the factors. Additionally, the determination of a time segment may be complicated by further dividing the base determinant, hour of day, into smaller portions, such as half hour or even minute. Such complexity may increase the accuracy of the final calculated weighted averages. However, the gain over using more simplistic measurements, such as hour of day and possibly day of week, is unlikely to be worth the required use of system resources. Typically, the large number of records present in most server logs require fairly extensive use of processing resources for analysis.

After the time segments have been determined, a window of time and weighting method also is specified in order to calculate weighted averages, which are used as the "best guess number of requests". The window of time refers to the number of time segments to be considered. For example, if the time segments are determined to be TS1=12 a.m.–11 a.m. and TS2=12 p.m.–11 p.m., then for TS1 the four prior time segments would include the data from 12 a.m.–11 a.m. for the most current log and the 3 preceding days. Weighting method refers to what degree the older data versus the newer data in the window of time will be used in calculating the weighted averages and potentially time gaps tolerances as well. With exponential weighting, exponentially more emphasis is given to the newer data in calculating the weighted averages.

Figure 4A:
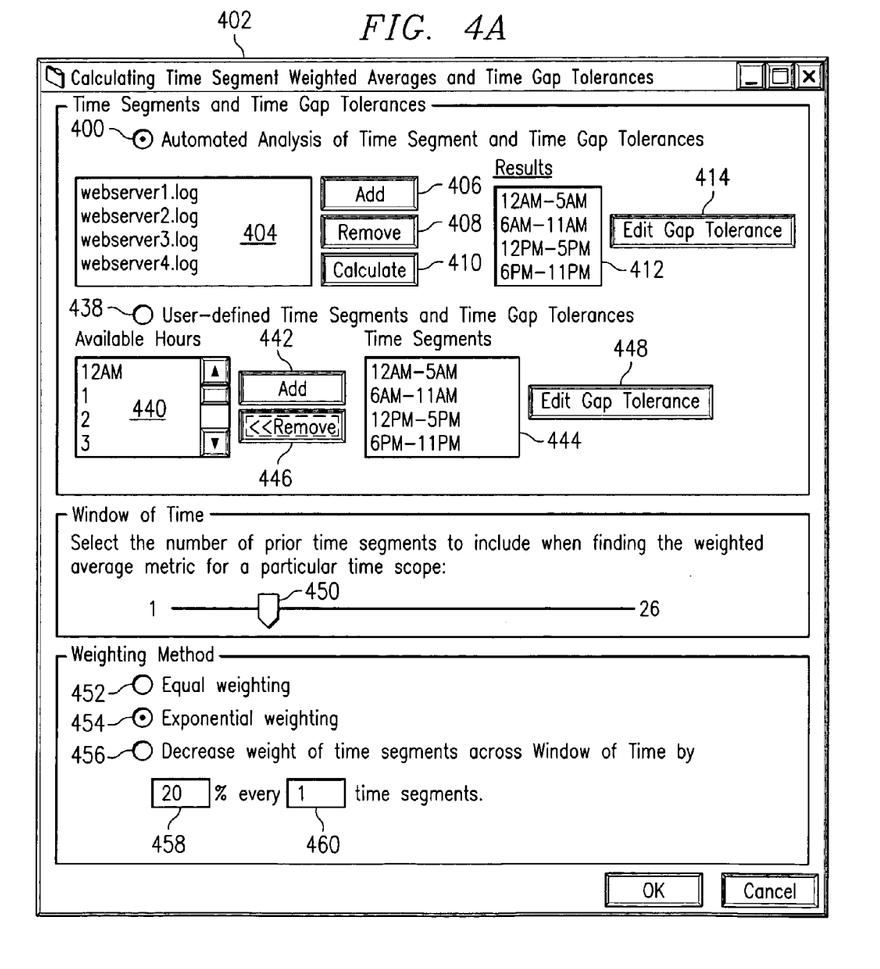
FIGS. 4A and 4B are diagrams illustrating a user interface for calculating time segment weighted averages and time gap tolerances in accordance with a preferred embodiment of the present invention.
Figure 4B:
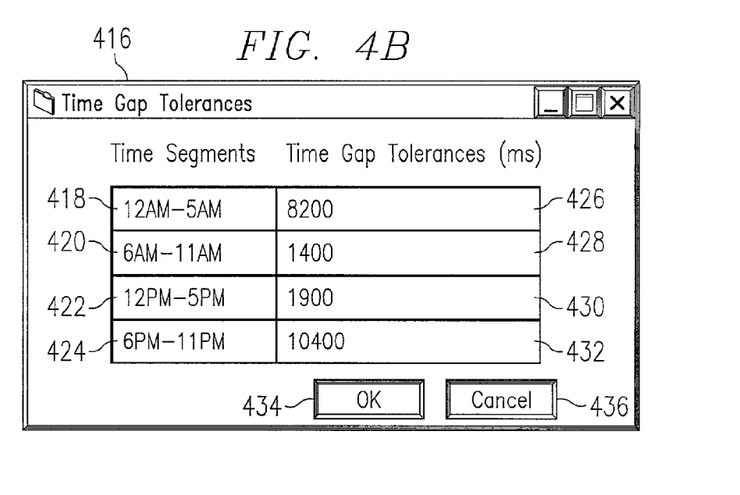

With reference now to FIGS. 4A and 4B, diagrams illustrating a user interface for calculating time segment weighted averages and time gap tolerances is depicted in accordance with a preferred embodiment of the present invention. In this example, a user may select option 400 in window 402 in FIG. 4A for an automated analysis of time segment and time gap tolerances. Logs may be selected from section 404 for analysis. Logs may be added to section 404 by selecting "Add" button 406. Selection of this button results in a display of a window or menu presenting logs that may be selected for analysis. Logs may be removed from section 404 by selecting a particular log and pressing "Remove" button 408. Pressing of "Calculate" button 410 results in logs identified in section 404 being analyzed for time segment and time gap tolerances. Results of time gap tolerances may be selected in section 412. These results may be edited by "Edit Gap Tolerance" button 414.

Window 416 in FIG. 4B is an example of an interface used to edit time gap tolerances in response to a selection of "Edit Gap Tolerance" button 414. This window displays time segments and time gap tolerances for the corresponding segments. Time segments, in window 416, are shown in fields 418, 420, 422, and 424, while time gap tolerances are displayed in fields 426, 428, 430, and 432. A user may edit the time gap tolerances in fields 426, 428, 430, and 432. If the user is satisfied with the tolerances, any changes may be saved by selecting "OK" button 434. Changes may be discarded by selected "Cancel" button 436.

Additionally, a user may manually define time segments and time gap tolerances by selecting option 438 in window 402 in FIG. 4A. Available hours for time segments are found in field 440. Hours for time segments may be added by selecting "Add" button 442 to generate time segments as shown in field 444. Time segments may be removed by selecting "Remove" button 446. The gap tolerances may be edited by selecting "Edit Gap Tolerance" button 448. Selection of this button results in a window, such as window 416 in FIG. 4B being displayed to the user.

Window 402 also allows a user to alter a window of time by manipulating slider 450. As used herein, a "window of time" is a number of prior segments that are included when a weighted average metric for a particular time scope is found. In the depicted examples, a window of time may include 1 to 26 prior time segments.

Weighting methods may be selected through options 452, 454, and 456. Option 452 provides for equal weighting, while option 454 provides for exponential weighting. Option 456 allows the user to decrease the weight of time segments over a window of time by a selected percentage every certain number of time segments by entering values in field 458 and 460. In this example, the percentage is 20 and number of time segments is 1.

Figure 5:
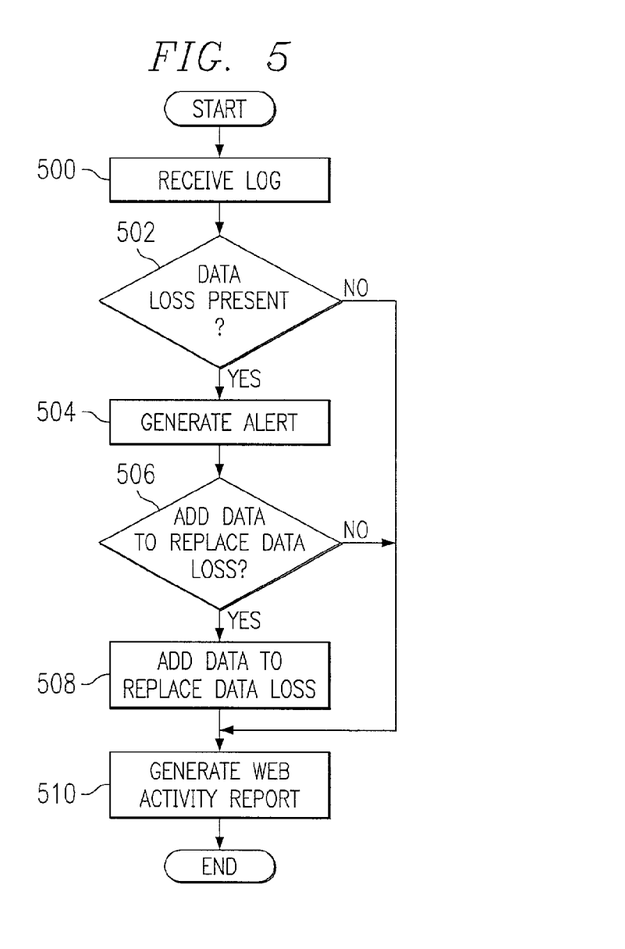
FIG. 5 is a flowchart of a process used for analyzing a log in accordance with a preferred embodiment of the present invention.

Turning next to FIG. 5, a flowchart of a process used for analyzing a log is depicted in accordance with a preferred embodiment of the present invention. The process illustrated in FIG. 5 may be implemented in a log analyzer, such as log analyzer 300 in FIG. 3.

The process begins by receiving a log (step 500). A determination is then made as to whether data loss is present (step 502). This determination is made using a data integrity metric algorithm such as that outlined above. In particular, a determination is made as to whether a time gap tolerance has been exceed for a particular time segment. If data loss is present, an alert is generated (step 504). A determination is made as to whether summary data is to be added to replace the loss (step 506). If the answer to this determination is yes, data is added to replace the loss (step 508).

Thereafter, a Web activity report is generated (step 510) with the process terminating thereafter. The Web activity report presents results, such as hits, page views, and sessions as reflected in the log for some period of time. This report may be in text and/or include images, such as graphs or pie charts. This Web activity report also may include an identification as to the confidence or accuracy of the analysis. For example, the report may state that the numbers reflect the likely number of total hits with a 95 percent confidence. Turning back to step 506, if data is not to be added to replace the loss, then the process terminates. With reference again to step 502, if no data loss is present, the process terminates.

Figure 6:
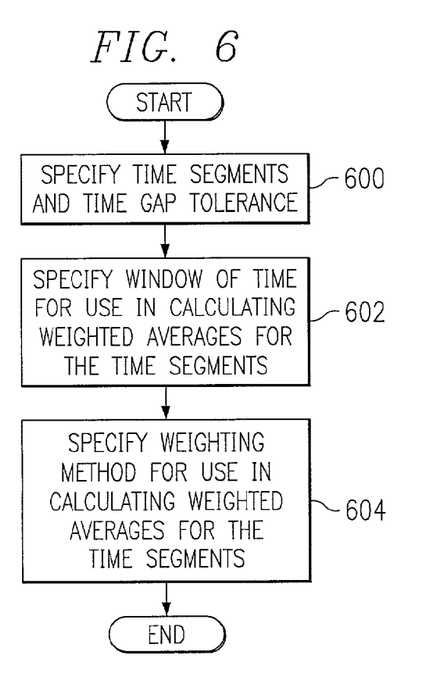
FIG. 6 is a flowchart of a process used for generating time segments and time gap tolerances for use in calculating data integrity metrics in accordance with a preferred embodiment of the present invention.

With reference now to FIG. 6, a flowchart of a process used for generating time segments and time gap tolerances for use in calculating data integrity metrics is depicted in accordance with a preferred embodiment of the present invention. The process illustrated in FIG. 6 may be implemented in a log analyzer, such as log analyzer 300 in FIG. 3.

The process begins with a specification of time segments and time gap tolerance (step 600). The specification of time gap tolerances may be made through an automated process analyzing "clean" example logs. As used herein, "clean" logs are logs that are known to contain no time gaps due to data loss. In this example, a user provides 4 example logs that are believed to be free of data loss. The process in step 600 goes through the logs record by record and combines all of the data from matching 30 minute chunks of time. The number of chunks may vary because of differences in log file time coverage. For example, the first chunk may be the combined data from all four logs for the time period of 12:00 a.m.–12:29 a.m.

For each chunk within a log, an average time gap value and standard deviation is calculated by adding together all of the time gaps (x) and dividing by the number of requests (n) during that 30 minute chunk:

Average:

Standard Deviation:

Time segments are determined by successively comparing the average time gaps of adjacent chunks. For example, beginning at chunk #1, the average from chunk #1 is compared to the average of chunk #2. If the average of chunk #2 is within 2 standard deviations (+or –) of the average of chunk #1, then the chunk #2 and chunk #1 are considered to be within the same time segment. The procedure is then followed for the comparison of chunk #2 and chunk #3 and for other successive chunks within the log.

After all time segments have been determined, the $$\bar{x} = \frac{(\Sigma x)}{n}$$

process in step 600 returns to the original data used to calculate the chunk time gap averages and standard $$SD = \sqrt{\frac{(\Sigma(x-\bar{x}))^2}{n-1}}$$

deviations to calculate an average time gap and standard deviation for each time segment. The time gap tolerance for each time segment is then calculated by multiplying 4 by the standard deviation of the time gap average and adding that product to the time gap average.

Alternatively, in step 600, the time segments and time gap tolerances may be user defined. Time segments, in this example, may be created by receiving a selection of one or more hours from the user and adding these hours to the hour segments list. Next, user input is received for time gap tolerances for each of the time segments.

A window of time is specified for use in calculating weighted averages for the time segments (step 602). User input is received as to how many prior time segments are to be included in the previous average that is to be used as the "best guess number of requests". Then, a weighting method is specified for use in calculating averages for the time segments (step 604) with the process terminating thereafter. The weighting method is specified through a user input. This weighting method is used to calculate weighted averages for the time segments. In the depicted examples, the user may choose whether to use one of the following weighting methods:
(1) equal weighting (each prior time segment contributes as much to the final average as the more recent ones);
(2) exponential weighting (prior time segments contribute exponentially less to the final average—appropriate for this case since web sites typically change content frequently), $$\bar{x}_k = \alpha \bar{x}_{k-1} + (1-\alpha) x_k;$$

and (3) linearly decreasing weighting (prior time segments contribute less in a linear fashion to the final average).

After the time segments and the associated time gap tolerances are stored, the log analyzer process may begin to process new server logs as they are provided. The log analyzer may provide alerts when the time gap tolerance is exceeded for any particular time segment. However, in these examples, the log analyzer will not calculate and store weighted averages for each time segment, which will be used as the "best guess number of requests" until the total amount of log data includes at the least the same number of matching time segments as the window of time value. For example, if TS1 is 12 a.m.–11 a.m. and the logs span 24 hours, then the log analyzer will wait until 4 logs (if the window of time value is 4) have been provided before calculating weighted averages. A weighted average using 4 values cannot be calculated until there are 4 values to use.

Figure 7:
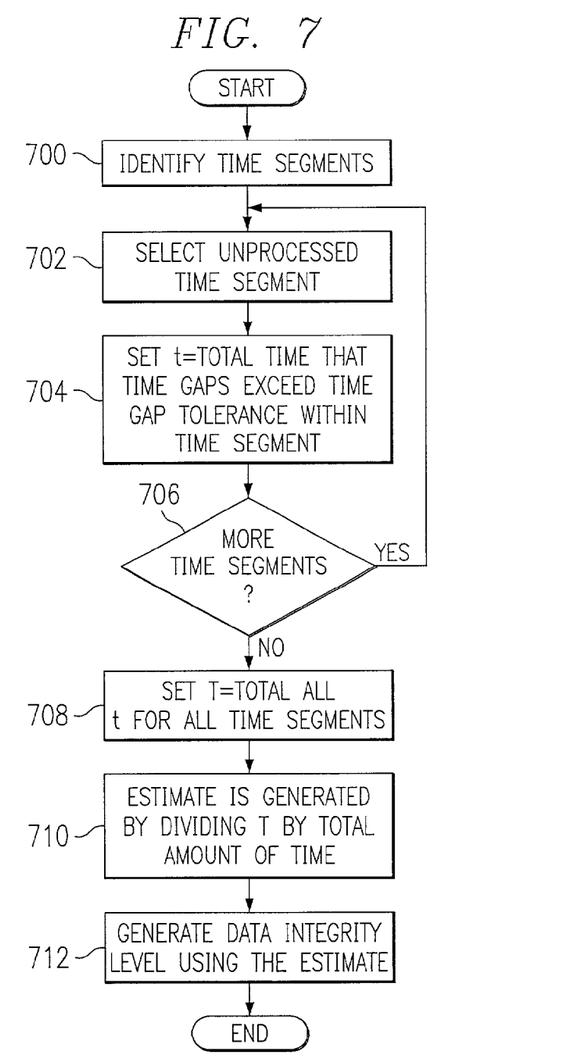
FIG. 7 is a flowchart of a process used for calculating a data integrity level in accordance with a preferred embodiment of the present invention.

Turning next to FIG. 7, a flowchart of a process used for calculating a data integrity level is depicted in accordance with a preferred embodiment of the present invention. The process illustrated in FIG. 7 may be implemented in a log analyzer, such as log analyzer 300 in FIG. 3.

The process begins by identifying a set of time segments for processing (step 700). Next, an unprocessed time segment is selected from the set of time segments (step 702). A variable t is set equal to the total number of times that time gaps exceed a time gap tolerance within the time segment being processed (step 704).

Then, a determination is made as to whether additional unprocessed time segments are present within the set of time segments (step 706). If additional unprocessed time segments are present, the process returns to step 702 as described above. Otherwise, the variable T is set equal to the total of all t for all time segments within the set of time segments (step 708). Then, an estimate is generated by dividing T by the amount of time spanned by the set of time segments (step 710). A data integrity level is then generated using the estimate (step 712) with the process terminating thereafter.

The product of steps 708 and 710 form an estimate of the percentage of data that is missing, and therefore was "filled-in" or replaced with comparable data. The data integrity level is calculated by subtracting the product of steps 708 and 710 from "1" and multiplying that by 100. For instance, if the product of steps 708 and 710 is "0.10" (estimated that 10% of the data was lost), the data integrity level would be 90%.

Thus, the present invention provides an improved method, apparatus, and computer implemented instructions for calculating data integrity metrics for Web server activity log analysis. This mechanism provides an ability to identify when a log is missing data. The mechanism includes determining whether time gaps for data points, such as hits, page views, or session exceed some threshold indicating that data is missing.

Additionally, the mechanism also may fill-in missing data to increase the accuracy or integrity of the report. The data used to fill-in missing data is taken from prior logs in these examples. The actual data selected is based on comparing similar times, dates, or days of the week from the prior logs with the corresponding times, dates, or days of the week in the portion of the log in which data is missing. Of course other mechanisms or dimensions may be used to identify or recreate the missing data depending on the particular implementation.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a RAM, CD-ROMs, and transmission-type media such as digital and analog communications links.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a data processing system for maintaining data integrity in logs, the method comprising:

reviewing a log, wherein the log includes a set of time segments, and wherein each time segment within to set of time segments is determined by successively comparing average time gaps of adjacent undetermined chunks of time, and wherein the set of time segments include at least one time segment defined by a user;

determining whether the log contains a data loss, wherein the determining step includes analyzing each time segment within the set of time segments to determine whether a time segment gap tolerance has been exceeded, and wherein the time segment gap tolerance is determined by multiplying a total number of clean logs by a standard deviation of a time gap average for the total number of clean logs and adding that product to the time gap average; and adding data to replace the data loss in the log to increase integrity of the log if a determination is made that a data loss has occurred.

2. The method of claim 1, wherein the data added to replace the data loss comprises data derived from a prior log.

3. The method of claim 1, wherein the data added to replace the data loss comprises data derived from a set of prior logs.

4. The method of claim 1, wherein the log includes data indicating at least one of requests, page views, and sessions.

5. The method of claim 1, wherein the analyzing step includes considering data in at least one time segment adjacent to a time segment being analyzed.

6. The method of claim 1, wherein the log is a Web server log.

7. A method in a data processing system for analyzing a log, the method comprising:

analyzing a set of time segments in the log to determine whether a time segment gap tolerance has been exceeded for a time segment within the set of time segments, wherein each time segment within the set of time segments is determined by successively comparing the average time gaps of adjacent predetermined chunks of time, and wherein the time segment gap tolerance is determined by multiplying a total number of clean logs by a standard deviation of a time gap average for the total number of clean logs and adding that product to the time gap average, and wherein the set of time segments include at least one time segment defined by a user; and responsive to a determination that the time segment gap tolerance has been exceeded for the time segment within the set of time segments, generating a alert.

8. The method of claim 7 further comprising:

responsive to detecting the alert, adding data to the time segment within the set of time segments to increase the data integrity of the log.

9. The method of claim 7, wherein the alert is presented on a user interface.

10. The method of claim 7, wherein the alert is a flag used by a program to process the log.

11. The method of claim 7 further comprising:

calculating a data integrity level for the log.

12. The method of claim 7, wherein the set of time segments include data for at least one of requests, page views, and sessions.

13. A data processing system comprising:
a bus system;
a communications unit connected to the bus system;
a memory connected to the bus system, wherein the memory includes a set of instructions; and
a processing unit connected to the bus system, wherein the processing unit executes the set of instructions to review a log, wherein the log includes a set of time segments, and wherein each time segment within the set of time segments is determined by successively comparing average time gaps of adjacent predetermined chunks of time, and wherein the set of time segments include at least one time segment defined by a user; determine whether the log contains a data loss by analyzing each time segment within the set of time segments to determine whether a time segment gap tolerance has been exceeded, and wherein the time segment gap tolerance is determined by multiplying a total number of clean logs by a standard deviation of a time gap average for the total number of clean logs and adding that product to the time gap average; and add data to replace the data loss in the log to increase integrity of the log if a determination is made that a data loss has occurred.

14. A data processing system comprising:
a bus system,
a communications unit connected to the bus system;
a memory connected to the bus system, wherein the memory includes a set of instructions; and
a processing unit connected to the bus system, wherein the processing unit executes the set of instructions to analyze a set of time segments in the log to determine whether a time segment gap tolerance has been exceeded for a time segment within the set of time segments, wherein each time segment within the set of time segments is determined by successively comparing average time gaps of adjacent predetermined chunks of time, and wherein the time segment gap tolerance is determined by multiplying a total number of clean logs by a standard deviation of a time gap average for the total number of clean logs and adding that product to the time gap average, and wherein the set of time segments include at least one time segment defined by a user; and generate an alert in response to a determination that the time segment gap tolerance has been exceeded for the time segment within the set of time segments.

15. A data processing system for maintaining data integrity in logs, the data processing system comprising:

reviewing means for reviewing a log, wherein the log includes a set of time segments, and wherein each time segment within the set of time segments is determined by successively comparing average time gaps of adjacent predetermined chunks of time, and wherein the set of time segments include at least one time segment defined by a user;

determining means for determining whether the log contains a data loss by analyzing each time segment within the set of time segments to determine whether a time segment gap tolerance has been exceeded, and wherein the time segment gap tolerance is determined by multiplying a total number of clean logs by a standard deviation of a time gap average for the total number of clean logs and adding that product to the time gap average; and adding means for adding data to replace the data loss in the log to increase integrity of the log if a determination is made that a data loss has occurred.

16. The data processing system of claim 15, wherein the data added to replace the data loss comprises data derived from a prior log.

17. The data processing system of claim 15, wherein the data added to replace the data loss comprises data derived from a set of prior logs.

18. The data processing system of claim 15, wherein the log includes data indicating at least one of requests, page views, and sessions.

19. The data processing system of claim 15, wherein the analyzing includes considering data in at least one time segment adjacent to a time segment being analyzed.

20. The data processing system of claim 15, wherein the log is a Web server log.

21. A data processing system for analyzing a log, the data processing system comprising:
   analyzing means for analyzing a set of time segments in the log to determine whether a time segment gap tolerance has been exceeded for a time segment within the set of time segments, wherein each time segment within the set of time segments is determined by successively comparing the average time gaps of adjacent predetermined chunks of time, and wherein the time segment gap tolerance is determined by multiplying a total number of clean logs by a standard deviation of a time gap average for the total number of clean logs and adding that product to the time gap average, and wherein the set of time segments include at least one time segment defined by a user; and
   generating means, responsive to a determination that the time segment gap tolerance has been exceeded for the time segment within the set of time segments, for generating an alert.

22. The data processing system of claim 21 further comprising:
   adding means, responsive to detecting the alert, for adding data to the time segment within the set of time segments to increase the data integrity of the log.

23. The data processing system of claim 21, wherein the alert is presented on a user interface.

24. The data processing system of claim 21, wherein the alert is a flag used by a program to process the log.

25. The data processing system of claim 21 further comprising:
   calculating means for calculating a data integrity level for the log.

26. The data processing system of claim 21, wherein the set of time segments include data for at least one of requests, page views, and sessions.

27. A computer program product in a computer readable medium that when executed carries out a method for maintaining data integrity in logs, the computer program product comprising:
   first instructions for reviewing a log, wherein the log includes a set of time segments, and wherein each time segment within the set of lime segments is determined by successively comparing average time gaps of adjacent predetermined chunks of time, and wherein the set of time segments include at least one time segment defined by a user;
   second instructions for determining whether the log contains a data loss by analyzing each time segment within the set of time segments to determine whether a time segment gap tolerance has been exceeded and wherein the time segment gap tolerance is determined by multiplying a total number of clean logs by a standard deviation of a time gap average for the total number of clean logs and adding that product to the time gap average; and
   third instructions for adding data to replace the data loss in the log to increase integrity of the log if a determination is made that a data loss has occurred.

28. The computer program product of claim 27, wherein the data added to replace the data lose comprises data derived from a prior log.

29. The computer program product of claim 27, wherein the data added to replace the data loss comprises data derived from a set of prior logs.

30. The computer program product of claim 27, wherein the log includes data indicating at least one of requests, page views, end sessions.

31. The computer program product of claim 27, wherein the analyzing includes considering data in at least one time segment adjacent to a time segment being analyzed.

32. The computer program product of claim 27, wherein the log is a Web server log.

33. A computer program product in a computer readable medium that when executed carries out a method for analyzing a log, the computer program product comprising:
   first instructions for analyzing a set of time segments in the log to determine whether a time segment gap tolerance has been exceeded for a time segment within the set of time segments, wherein each time segment within the set of time segments is determined by successively comparing average time gaps of adjacent predetermined chunks of time, and wherein the time segment gap tolerance is determined by multiplying a total number of clean logs by a standard deviation of a time gap average for the total number of clean logs and adding that product to the time gap average, and wherein the set of time segments include at least one time segment defined by a user; and
   second instructions, responsive to a determination that the time segment gap tolerance has been exceeded for the time segment within the set of time segments, for generating an alert.

34. The computer program product of claim 33 further comprising:
   third instructions, responsive to detecting the alert, for adding data to the time segment within the set of time segments to increase the data integrity of the log.

35. The computer program product of claim 33, wherein the alert is presented on a user interface.

36. The computer program product of claim 33, wherein the alert is a flag used by a program to process the log.

37. The computer program product of claim 33 further comprising:
   third instructions for calculating a data integrity level for the log.

38. The computer program product of claim 33, wherein the set of time segments include data for at least one of requests, page views, and sessions.

* * * * *

UNITED STATES PATENT AND TRADEMARK OFFICE
CERTIFICATE OF CORRECTION

PATENT NO.       : 7,035,772 B2
APPLICATION NO.  : 09/871498
DATED            : April 25, 2006
INVENTOR(S)      : M. Etgen It is certified that error appears in the above-identified patent and that said Letters Patent is hereby corrected as shown below:

<u>Column 9</u>
Line 5, replace "within to set" with --within the set--
Line 7, replace "undetermined" with --predetermined--
Line 51, replace "a alert" with --an alert--

<u>Column 11</u>
Line 56, replace "lime" with --time--

<u>Column 12</u>
Line 12, replace "lose" with --loss--
Line 19, replace "end sessions" with --and sessions--

Signed and Sealed this

Twenty-second Day of August, 2006

JON W. DUDAS
*Director of the United States Patent and Trademark Office*